United States Patent
Wang et al.

(10) Patent No.: US 12,298,839 B2
(45) Date of Patent: May 13, 2025

(54) METHOD FOR CONTROLLING DISTRIBUTED OPERATION SYSTEM, DEVICE, AND MEDIUM

(71) Applicant: BEIJING BAIDU NETCOM SCIENCE TECHNOLOGY CO., LTD., Beijing (CN)

(72) Inventors: Shuaijian Wang, Beijing (CN); Shiyong Li, Beijing (CN); Henghua Zhang, Beijing (CN); Panpan Li, Beijing (CN); Zaibin Hu, Beijing (CN); Baotong Luo, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/041,035

(22) PCT Filed: Jun. 7, 2022

(86) PCT No.: PCT/CN2022/097438
§ 371 (c)(1),
(2) Date: Feb. 8, 2023

(87) PCT Pub. No.: WO2023/115836
PCT Pub. Date: Jun. 29, 2023

(65) Prior Publication Data
US 2024/0303142 A1    Sep. 12, 2024

(30) Foreign Application Priority Data

Dec. 24, 2021  (CN) .......................... 202111602689.1

(51) Int. Cl.
  *G06F 11/07*   (2006.01)
  *G06F 9/455*   (2018.01)
  *G06F 11/14*   (2006.01)

(52) U.S. Cl.
  CPC ...... *G06F 11/0712* (2013.01); *G06F 9/45558* (2013.01); *G06F 11/079* (2013.01);
  (Continued)

(58) Field of Classification Search
  CPC . G06F 11/0712; G06F 11/079; G06F 11/1438
  See application file for complete search history.

(56) References Cited

U.S. PATENT DOCUMENTS

| | | | |
|---|---|---|---|
| 2018/0024889 A1* | 1/2018 | Verma | G06F 11/0766 714/15 |
| 2021/0011749 A1* | 1/2021 | Kanakeshan | G06F 9/45558 |

FOREIGN PATENT DOCUMENTS

| | | |
|---|---|---|
| CN | 104915263 A | 9/2015 |
| CN | 104992148 A | 10/2015 |

(Continued)

OTHER PUBLICATIONS

Extended European Search Report issued in corresponding EP Application No. 22847523.2 dated Mar. 14, 2024 (10 pages).

(Continued)

*Primary Examiner* — Nadeem Iqbal
(74) *Attorney, Agent, or Firm* — Osha Bergman Watanabe & Burton LLP

(57) ABSTRACT

A method for controlling a distributed operation system includes: for a first container carrying a first process, determining a current fault type of a failure in the first container in response to detecting that the first process is triggered to terminate based on the failure in the first container; and reconstructing the first container and restarting the first process based on the first container reconstructed in response to determining that the current fault type is consistent with a target fault type. The target fault type is a fault (Continued)

type suitable for reconstruction of each container in the distributed operation system to which the first container belongs.

15 Claims, 3 Drawing Sheets

(52) U.S. Cl.
CPC .............. *G06F 11/1438* (2013.01); *G06F 2009/45591* (2013.01); *G06F 2201/815* (2013.01)

(56) References Cited

FOREIGN PATENT DOCUMENTS

| CN | 105681077 A | 6/2016 |
|---|---|---|
| CN | 108737215 A | 11/2018 |
| CN | 109271249 A | 1/2019 |
| CN | 109584276 A | 4/2019 |
| CN | 109710492 A | 5/2019 |
| CN | 110445884 A | 11/2019 |
| CN | 111880981 A | 11/2020 |
| CN | 114416284 A | 4/2022 |
| JP | 2012068719 A | 4/2012 |
| JP | 2012118927 A | 6/2012 |
| WO | 2015146101 A1 | 10/2015 |
| WO | 2019003973 A1 | 1/2019 |

OTHER PUBLICATIONS

International Search Report issued in International Application No. PCT/CN2022/097438 dated Aug. 31, 2022 (6 pages).
Written Opinion issued in International Application No. PCT/CN2022/097438 dated Aug. 31, 2022 (7 pages).
Decision to Grant issued in Japanese Application No. 2022-539761, mailed on Apr. 18, 2023 (5 pages).

\* cited by examiner

METHOD FOR CONTROLLING DISTRIBUTED OPERATION SYSTEM, DEVICE, AND MEDIUM

CROSS-REFERENCE TO RELATED APPLICATION

This application is a Section 371 National Stage Application of International Application No. PCT/CN2022/097438, filed Jun. 7, 2022, which claims priority and benefits of Chinese Patent Application No. 202111602689.1, filed Dec. 24, 2021, the entire contents of which are incorporated herein by reference.

FIELD

The present disclosure relates to a computer application technical field, and in particular to a distributed operation technical field.

BACKGROUND

A distributed operation system is used to execute a distributed operation, which carries corresponding processes of the distributed operation through one or more containers. Further, an operation result of the distributed operation is obtained through process execution results of the corresponding processes.

SUMMARY

The present disclosure provides a method for controlling a distributed operation system, a device, and a medium.

According to a first aspect of the present disclosure, a method for controlling a distributed operation system is provided. The method includes: for a first container carrying a first process, determining a current fault type of a failure in the first container in response to detecting that the first process is triggered to terminate based on the failure in the first container; and reconstructing the first container and restarting the first process based on the first container reconstructed in response to determining that the current fault type is consistent with a target fault type. The target fault type is a fault type suitable for reconstruction of each container in the distributed operation system to which the first container belongs.

According to a second aspect of the present disclosure, an electronic device is provided. The electronic device includes: at least one processor; and a memory communicatively connected to the at least one processor. The memory stores instructions executable by the at least one processor, and the at least one processor is configured to execute the instructions to perform the method for controlling the distributed operation system as described above.

According to a third aspect of the present disclosure, a non-transitory computer-readable storage medium is provided. The non-transitory computer-readable storage medium has stored therein computer instructions configured to cause a computer to perform the method for controlling the distributed operation system as described above.

It should be understood that the content described in this part is neither intended to identify key or significant features of embodiments of the present disclosure, nor intended to limit the scope of the present disclosure. Other features of the present disclosure will become easier to understand through the following description.

BRIEF DESCRIPTION OF THE DRAWINGS

The accompanying drawings are intended to provide a better understanding of the present disclosure and do not constitute a limitation on the present disclosure, in which.

DETAILED DESCRIPTION

Figure 1:
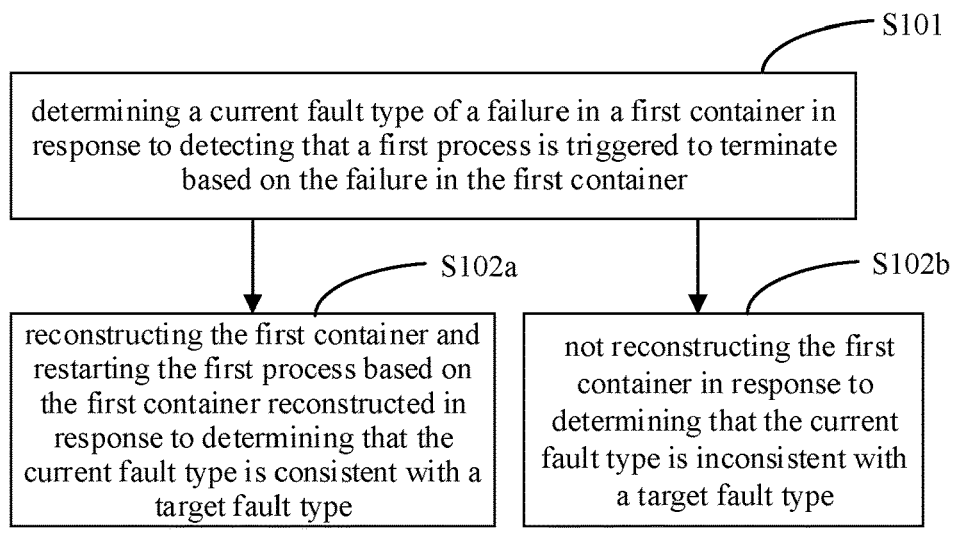
FIG. 1 is a schematic flowchart showing a method for controlling a distributed operation system according to an embodiment of the present disclosure.

Embodiments of the present disclosure are illustrated below with reference to the accompanying drawings, which include various details of embodiments of the present disclosure to facilitate understanding and should be considered only as explanatory. Therefore, those skilled in the art should be aware of that various changes and modifications can be made to the embodiments described herein without departing from the scope and spirit of the present disclosure. Similarly, for clarity and simplicity, descriptions of well-known functions and structures are omitted in the following description.

A method for controlling a distributed operation system in embodiments of the present disclosure may be applied to a distributed operation scenario. For example, the method may be applied to a scenario for artificial intelligence (AI) training through a distributed operation.

The distributed operation system is configured to execute a distributed operation, and carries corresponding processes of the distributed operation through one or more containers. In the related art, during the execution of the distributed operation by the distributed operation system, a container carrying a respective process may fail. In a case where a container fails, the process carried by the failed container will be terminated, such that an operation content corresponding to the process cannot be completed. In the related art, for a process that is forced to terminate due to the failure of the container, in order to obtain an execution result corresponding to the process, the failed container is generally reconstructed, and the process previously terminated is restarted by the container reconstructed.

Generally, there are many fault types, which include a fault type suitable for the reconstruction of each container in the distributed operation system, for example, a system failure that occurs in a failed container itself, and a fault type not suitable for the reconstruction of each container in the distributed operation system, for example, code failures caused by program errors. For the fault type suitable for the reconstruction of each container in the distributed operation system, the distributed operation system may reconstruct the failed container. However, for the fault type not suitable for the reconstruction of each container in the distributed operation system, the distributed operation system cannot successfully reconstruct the failed container.

In the related art, container reconstruction scenarios will not be distinguished according to the fault type of the container. The distributed operation system will reconstruct the container no matter what type of failure occurs in the container. On a basis of this, in a case where the fault type of the failed container is not suitable for the reconstruction of each container in the distributed operation system, not only the execution result of the process carried by the failed container cannot be obtained, but also an overall operation cycle of the distributed operation is prolonged since the distributed operation system waits for the completion of the reconstruction of the container. This method cannot meet the operation requirements for the distributed operation system.

Embodiments of the present disclosure provide a method for controlling a distributed operation system, which may determine a current fault type of a container when the container fails and match the current fault type with a target fault type. Further, the failed container is reconstructed when the current fault type is consistent with the target fault type. Since the target fault type is a fault type suitable for the reconstruction of each container in the distributed operation system, the distributed operation system may successfully complete the reconstruction of the container. Based on this, after the failed container is reconstructed, the process previously terminated is restarted to obtain an execution result, which is then merged into an operation result of the operation to which the process belongs. This method can meet the operation requirements.

For the convenience of description, in the following, the failed container is called a first container, and a process that is triggered to terminate due to the failure in the first container is called a first process. It may be understood that the first process is a process carried by the first container.

FIG. 1 is a schematic flowchart showing a method for controlling a distributed operation system according to an embodiment of the present disclosure. As shown in FIG. 1, the method includes the following steps S101, S102a and S102b.

In step S101, a current fault type of a failure in a first container is determined in response to detecting that a first process is triggered to terminate based on the failure in the first container.

In step S102a, the first container is reconstructed, and the first process is restarted based on the first container reconstructed, in response to determining that the current fault type is consistent with a target fault type.

In embodiments of the present disclosure, the target fault type is a fault type suitable for the reconstruction of each container in the distributed operation system. In other words, if a container occurs a failure of the target fault type, the container can be successfully reconstructed. For example, it is possible to pre-determine reconstruction results corresponding to the container when different types of failures occur in the container. For example, the reconstruction results include reconstruction success and/or reconstruction failure. Further, according to the reconstruction results, the fault type suitable for the reconstruction of each container in the distributed operation system is determined and set as the target fault type.

For example, for a scenario where the current fault type is consistent with the target fault type, it is determined that the first container can be successfully reconstructed. In this case, the first container is reconstructed, and the first process is restarted through the first container reconstructed. Based on this, the execution result of the first process may be obtained, and added into the operation result of the operation to which the first process belongs. In this way, the operation requirements may be met.

In step S102b, the first container is not reconstructed in response to determining that the current fault type is inconsistent with the target fault type.

For example, the first container will not be reconstructed for a scenario where the current fault type is inconsistent with the target fault type. For the case of not reconstructing the first container, in an embodiment, the first process may be abandoned to obtain a final operation result of the operation to which the first process belongs in response to determining that an operation flexibility of the operation to which the first process belongs meets a requirement. In another embodiment, the operation result of the operation to which the first process belongs may be determined as the operation failure in response to determining that the operation flexibility of the operation to which the first process belongs does not meet the requirement, or the operation result of the operation to which the first process belongs may be directly determined as the operation failure. Further, the operation may be abandoned or re-executed with a complete process according to subsequent actual needs. The operation flexibility mentioned in the above embodiments is configured to represent the accuracy of the operation result of the operation to which the first process belongs without the execution result of the first process.

The method for controlling the distributed operation system in embodiments of the present disclosure may reconstruct the failed container and restart the process terminated in case of the current fault type being consistent with the target fault type, such that the execution result corresponding to the process previously terminated may be obtained, which may meet the operation requirements. In case of the current fault type being inconsistent with the target fault type, the reconstruction of the container may be avoided, which may reduce a possibility that the overall cycle of the operation is too long due to the failure of restart and reconstruction of the process, thus meeting the operation requirements.

For example, respective identifiers may be set for the current fault type and the target fault type. Based on this, whether the current fault type is consistent with the target fault type may be determined according to the respective identifiers set for the current fault type and the target fault type.

For the convenience of description, in the following, an identifier set according to the target fault type is called a first identifier, and an identifier set according to the current fault type of the container is called a second identifier.

Figure 2:
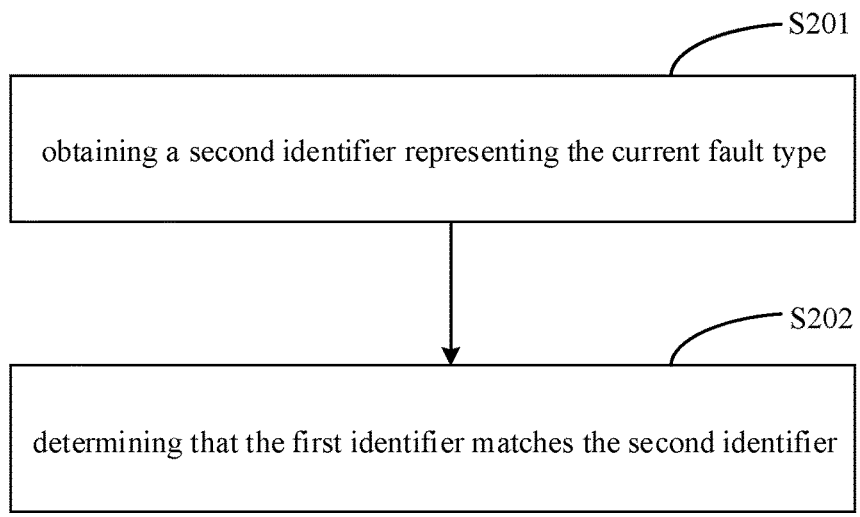
FIG. 2 is a schematic flowchart showing a process for determining that a current fault type is consistent with a target fault type according to an embodiment of the present disclosure.

FIG. 2 is a schematic flowchart showing a process for determining that the current fault type is consistent with the target fault type according to an embodiment of the present disclosure, which include steps S201 and S202, as shown in FIG. 2.

For example, the first identifier representing the target fault type may be preset and stored in the distributed operation system. Based on this, determining that the current fault type is consistent with the target fault type may be performed by the following manner.

In step S201, a second identifier representing the current fault type is obtained.

In step S202, it is determined that the first identifier matches the second identifier.

For example, the first identifier and/or the second identifier may be set through identifier codes, instructions, judgment conditions or the like to achieve type matching. The setting manner of the first identifier and/or the second identifier is not specifically limited in the present disclosure.

The method for controlling the distributed operation system in embodiments of the present disclosure may determine the fault type by means of identifier matching, which is convenient, fast and easy to be implemented, and may meet the operation requirements.

Generally, the container may generate an exit code in case that the process terminates. The exit code generated by the container is a numeric code in a range of 0 to 255. For example, in a case where the process is triggered to terminate when the process is completed, the container generates an exit code with a value of 0. For example, in a case where the process is terminated duce to the failure in the container, the container generates an exit code that matches the fault type occurred, for example, in a case where a container fails, the exit code generated by the container is any value from 1 to 255.

In an embodiment, the exit code inherent in the container and generated in case that a failure occurs may be used as the second identifier to represent the current fault type of the container. In addition, correspondingly, in case that the fault type of the failure in the container is suitable for the reconstruction of each container in the distributed operation system, the exit code generated by the container in such case may be used as the first identifier. Based on this, the fault type of the current failure in the container may be identified through the identifier inherently generated by the distributed operation system to determine whether to restart the container. This method does not need to set additional identifier, and may meet user's setting requirements.

For the convenience of description, in the following, the exit code representing the fault type suitable for the reconstruction of each container in the distributed operation system is called a first exit code, and the exit code representing the current fault type of the first container is called a second exit code.

Figure 3:
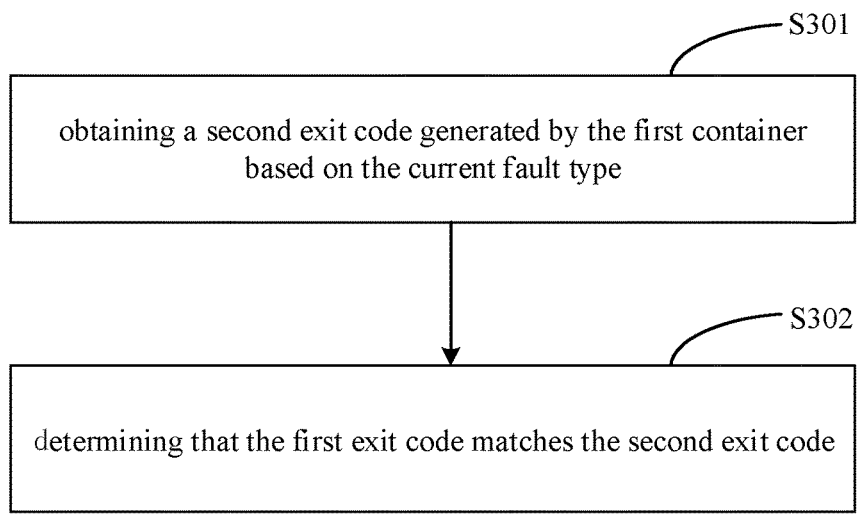
FIG. 3 is a schematic flowchart showing a process for determining that a current fault type is consistent with a target fault type according to an embodiment of the present disclosure.

FIG. 3 is a schematic flowchart showing a process for determining that the current fault type is consistent with the target fault type according to an embodiment of the present disclosure, which including the following steps S301 to S302, as shown in FIG. 3.

In step S301, a second exit code generated by the first container based on the current fault type is obtained.

In embodiments of the present disclosure, the distributed operation system may obtain the fault type of the failure in the container, and the container may generate an exit code with a corresponding value for the fault type obtained. The fault type of the failure in the container may be obtained by a conventional manner in the related art. For example, if the distributed operation system has a first number of resource cards, and only a second number (as an example, the second number is less than the first number) of resource cards are currently detected, it may be determined that the current fault type of the failure in the container is a fault type of system script card loss. In addition, similar to the above-mentioned manner, other fault types, such as video memory failure, computational power failure and code failure may be detected, which is not elaborated herein.

In step S302, it is determined that the first exit code matches the second exit code.

For example, in response to determining that the first exit code matches the second exit code, it may be determined that the current fault type of the container is the fault type suitable for the reconstruction of each container in the distributed operation system. Based on this, the corresponding steps such as the container reconstruction and the process restart may be performed subsequently.

Generally, the distributed operation system cannot retain an intermediate result in the operation process. For a distributed operation that needs the intermediate result to solve the operation result, the process execution result that is obtained after the failed container is reconstructed and the process terminated is restarted cannot be incorporated into the completed operation result. In this case, even if the process execution result is obtained by reconstructing the failed container and restarting the process terminated, the correct operation result cannot be obtained.

In embodiments of the present disclosure, in order to ensure the accuracy of the operation result, container reconstruction information matching the distributed operation may be configured in the distributed operation system, and the container reconstruction information is used to indicate a container to be reconstructed when a failure occurs in a container. Further, when a failure occurs in a container, the container reconstruction information matching the operation to which the failed container belongs may be obtained, and the container to be reconstructed that matches the container reconstruction information may be determined and reconstructed through the container reconstruction information obtained.

In an embodiment, in response to determining that the container to be reconstructed includes the first container based on the container reconstruction information, the first container failed may be reconstructed, and the process execution result may be obtained by restarting the process, so as to obtain the correct operation result by incorporating the process execution result.

Figure 4:
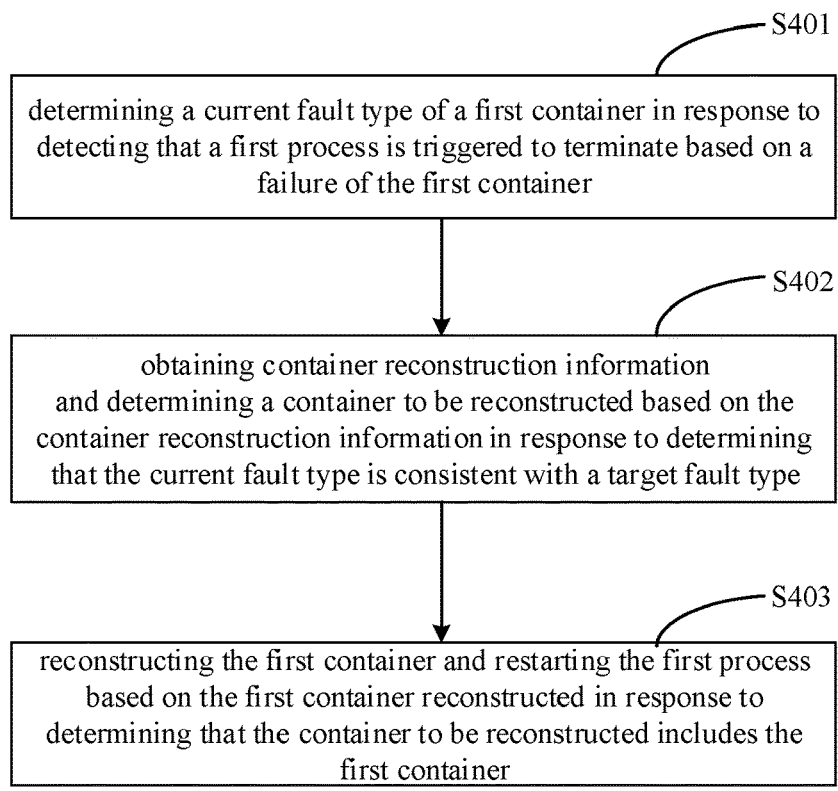
FIG. 4 is a schematic flowchart showing a method for controlling a distributed operation system according to an embodiment of the present disclosure.

FIG. 4 is a schematic flowchart showing a method for controlling a distributed operation system according to an embodiment of the present disclosure. As shown in FIG. 4, implementation of step S401 in embodiments of the present disclosure is similar to that of step S101 in FIG. 1, which will not be elaborated here.

In step S402, in a case where the current fault type is consistent with a target fault type, container reconstruction information is obtained, and a container to be reconstructed is determined based on the container reconstruction information.

In step S403, in a case where the container to be reconstructed includes a first container, the first container is reconstructed, and the first process is restarted based on the first container reconstructed.

In another embodiment, in response to determining that the container to be reconstructed includes not only the first container through the container reconstruction information, all of the containers to be reconstructed matching the container reconstruction information may be restarted.

Figure 5:
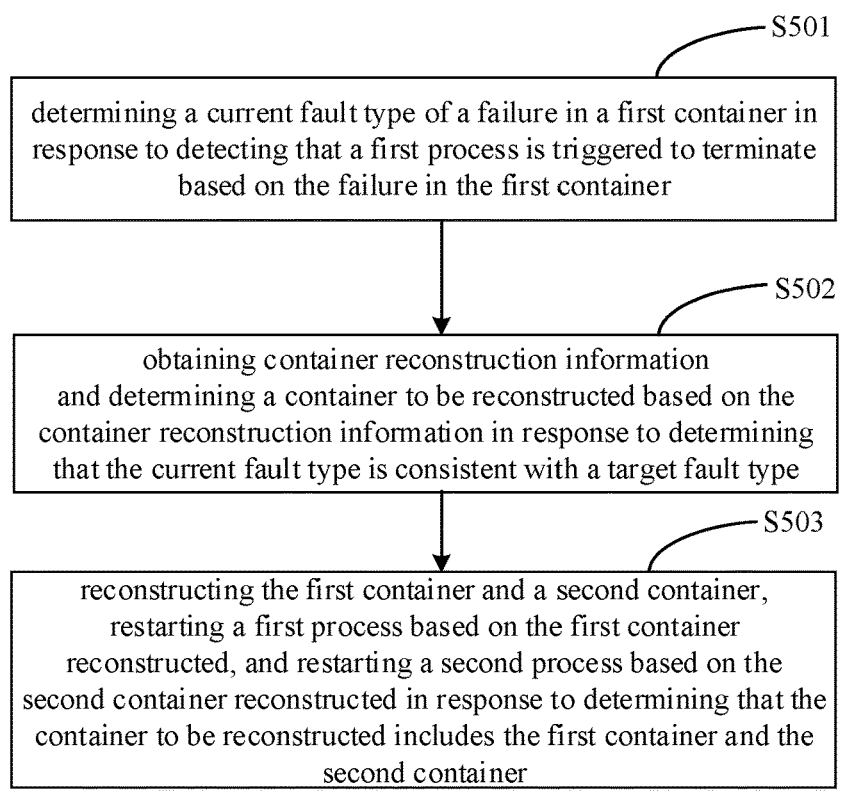
FIG. 5 is a schematic flowchart showing a method for controlling a distributed operation system according to an embodiment of the present disclosure.

FIG. 5 is a schematic flowchart showing a method for controlling a distributed operation system according to an embodiment of the present disclosure. As shown in FIG. 5, implementation of step S501 and step S502 in embodiments of the present disclosure is similar to that of step S401 and step S402 in FIG. 4, which will not be elaborated here.

In step S503, in a case where the container to be reconstructed includes a first container and a second container, the first container and the second container are reconstructed, the first process is restarted based on the first container reconstructed, and the second process is restarted based on the second container reconstructed.

For example, the second container may include at least one of the following containers.

(1) A container in a replica set to which the first container belongs.
(2) A container in a replica set that has an association relationship with a replica set to which the first container belongs.
(3) A container in an operation to which the first container belongs.

In embodiments of the present disclosure, the second container included in the container reconstruction information is used to re-execute respective processes together with the first container, so that the correct intermediate result may be obtained during the operation, and thus the correct operation result may be obtained. For example, for the above-mentioned situation (1), the first container and the second container are reconstructed, and the respective processes are restarted, which is equivalent to re-executing the replica set, so as to obtain the correct execution result matching the replica set. For example, for the above-mentioned situation (3), the first container and the second container are reconstructed, the respective processes are restarted, which is equivalent to re-executing the operation to which the first container belongs, so as to obtain the correct operation result matching the operation. It is noted that based on the disclosure of the present disclosure, any number of containers may be reconstructed according to actual needs. The situations (1) to (3) mentioned above are only reference examples.

The method for controlling the distributed operation system in embodiments of the present disclosure may perform container reconstruction with different granularities for containers to meet the container reconstruction requirements for different scenarios.

For example, in addition to the container reconstruction information and the first identifier mentioned above, the present disclosure may configure, such as, reconstruction strategy information, event information and/or reconstruction time information for the distributed operation system, according to the operation requirements. The reconstruction strategy information represents a switch command of the container reconstruction. The user may "one-click close" the container reconstruction by setting the reconstruction strategy information. In this case, the distributed operation system will not trigger the container reconstruction for any fault type of the container, so as to meet the user's personalized configuration requirements for different operation scenarios. Event information may be understood as information that represents corresponding state parameters of the distributed operation system. For example, the event information may include information about such as the machine state, the number and locations of available nodes. The reconstruction time information represents a time limitation for an event of "container reconstruction". For example, the reconstruction process may be terminated and the operation may be ended in a case where the reconstruction time of the failed container exceeds a corresponding time.

For example, for a distributed operation scenario where a container fails, a current state of the container may be synchronized in a real time through a state machine. For example, an operation state may be changed from a running state to a terminating state in a case where the container fails and the process terminates. Further, during the container reconstruction, the state of the container may be changed from a terminating state to a restarting state, and in a case where the container reconstruction is completed and the corresponding process is restarted, the state of the container may be changed from a restarting state to a running state. The method for controlling the distributed operation system in embodiments of the present disclosure may enable the distributed operation system or the user to perceive the state of the container in time and meet the operation requirements by displaying the corresponding state of the container through the state machine.

Based on the same design, embodiments of the present disclosure provide an apparatus for controlling a distributed operation system.

It is understood that the apparatus in embodiments of the present disclosure includes the corresponding hardware structure and/or software module to perform each function in order to realize the above-mentioned functions. In combination with the modules and algorithm steps of the examples disclosed in embodiments of the present disclosure, embodiments of the present disclosure may be realized in a form of hardware or a combination of hardware and computer software. Whether a function is implemented in the way of hardware or computer software driving hardware depends on the specific application and design constraints of the technical solution. Those skilled in the art may use different methods to achieve the described functions for each specific application, but such implementation should not be considered beyond the scope of the technical solution of the embodiments of the present disclosure.

Figure 6:
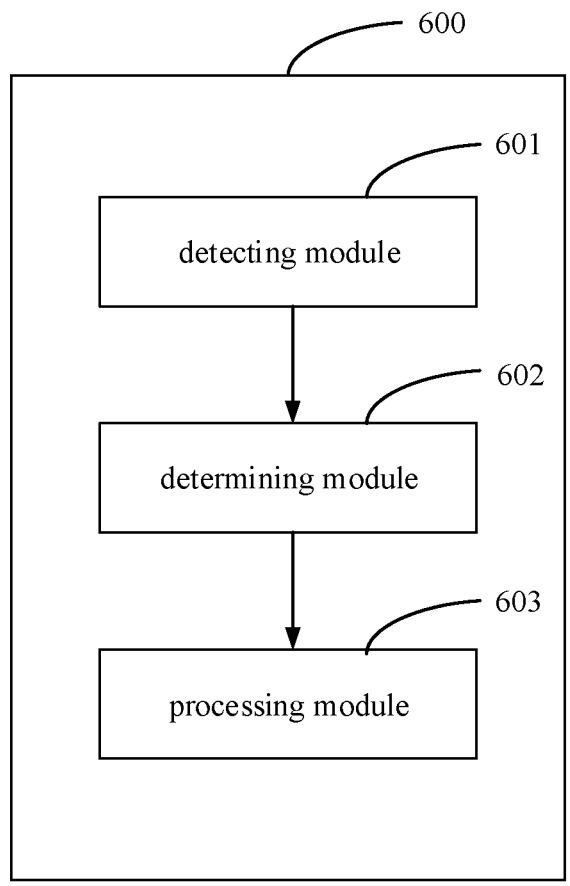
FIG. 6 is a schematic block diagram showing an apparatus for controlling a distributed operation system according to an embodiment of the present disclosure.

FIG. 6 is a schematic block diagram showing an apparatus for controlling a distributed operation system according to an embodiment of the present disclosure. As shown in FIG. 6, the apparatus 600 includes a detecting module 601, a determining module 602 and a processing module 603.

The detecting module 601 is configured to, for a first container carrying a first process, detect that the first process is triggered to terminate based on a failure in the first container. The determining module 602 is configured to determine a current fault type in the first container in response to detecting that the first process is triggered to terminate based on the failure in the first container. The processing module 603 is configured to reconstruct the first container and restart the first process based on the first container reconstructed in response to determining that the current fault type is consistent with a target fault type. The target fault type is a fault type suitable for reconstruction of each container in the distributed operation system to which the first container belongs.

In an embodiment, the target fault type is represented by a first identifier. The determining module 602 is configured to determine that the current fault type is consistent with the target fault type by obtaining a second identifier representing the current fault type, and determining that the first identifier matches the second identifier.

In an embodiment, the first identifier includes a first exit code generated by the first container when a failure of the target fault type occurs in the first container. The determining module 602 is configured to obtain the second identifier representing the current fault type by obtaining a second exit code generated by the first container based on the current fault type. The determining module 602 is configured to determine that the first identifier matches the second identifier by determining that the first exit code matches the second exit code.

In an embodiment, the determining module 602 is further configured to obtain container reconstruction information before reconstructing the first container. The container reconstruction information is configured to indicate a container to be reconstructed when a failure occurs in a container; and determine that the container to be reconstructed includes the first container based on the container reconstruction information.

In an embodiment, the determining module 602 is further configured to reconstruct a second container, and restart a second process carried by the second container based on the second container reconstructed in response to determining that the container to be reconstructed includes the second container based on the container reconstruction information. The second container includes at least one of the following container: a container in a replica set to which the first container belongs; a container in a replica set that has an association relationship with the replica set to which the first container belongs; or a container in an operation to which the first container belongs.

With regard to the apparatus in the above-mentioned embodiments, the specific operation manner of each module has been described in detail in embodiments of the method, and will not be described in detail here.

According to embodiments of the present disclosure, the present disclosure provides an electronic device, a readable storage medium and a computer program product.

According to embodiments of the present disclosure, an electronic device is provided. The electronic device includes: at least one processor; and a memory communicatively connected to the at least one processor. The memory stores instructions executable by the at least one processor, and the at least one processor is configured to execute the instructions to perform the method for controlling the distributed operation system as described above.

According to embodiments of the present disclosure, a non-transitory computer-readable storage medium is provided. The non-transitory computer-readable storage medium has stored therein computer instructions configured to cause a computer to perform the method for controlling the distributed operation system as described above.

According to embodiments of the present disclosure, a computer program product is provided. The computer program product includes a computer program that, when executed by a processor, causes the method for controlling the distributed operation system as described above to be implemented.

Figure 7:
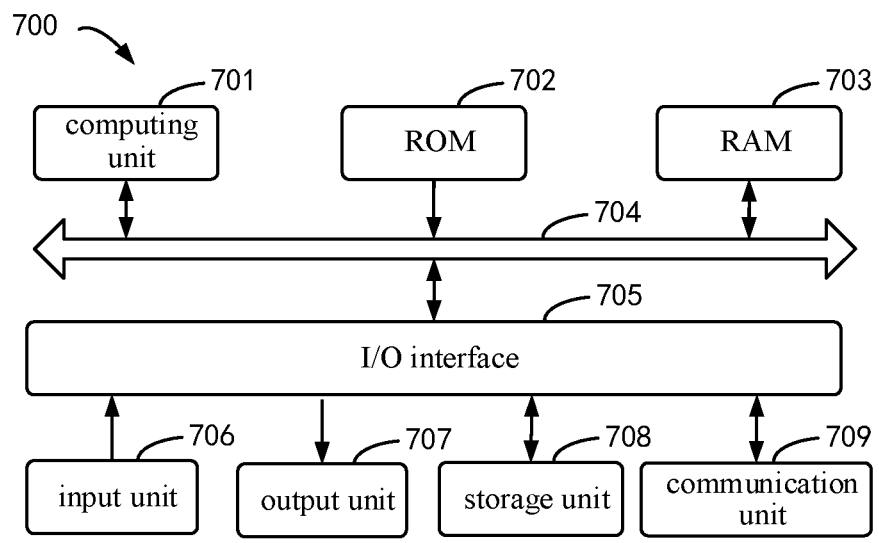
FIG. 7 is a schematic block diagram of an electronic device configured to perform a method for controlling a distributed operation system according to embodiments of the present disclosure.

FIG. 7 is a schematic block diagram of an electronic device 700 that may be configured to perform embodiments of the present disclosure. The electronic device is intended to represent various forms of digital computers, such as laptops, desktops, workbenches, personal digital assistants, servers, blade servers, mainframe computers and other suitable computing devices. The electronic device may further represent various forms of mobile devices, such as personal digital assistants, cellular phones, smart phones, wearable devices and other similar computing devices. The components, their connections and relationships, and their functions shown herein are examples only, and are not intended to limit the implementation of the present disclosure as described and/or claimed herein.

As shown in FIG. 7, the electronic device 700 may include a computing unit 701, which may perform various suitable actions and processing according to a computer program stored in a read-only memory (ROM) 702 or a computer program loaded from a storage unit 708 into a random access memory (RAM) 703. The RAM 703 may also store various programs and data required by the operations of the electronic device 700. The computing unit 701, the ROM 702 and the RAM 703 are connected to one another by a bus 704. An input/output (I/O) interface 705 is also connected to the bus 704.

A plurality of components in the electronic device 700 are connected to the I/O interface 705, including an input unit 706, such as a keyboard and a mouse; an output unit 707, such as various displays and speakers; a storage unit 708, such as disks and discs; and a communication unit 709, such as a network card, a modem and a wireless communication transceiver. The communication unit 709 allows the electronic device 700 to exchange information/data with other devices over computer networks such as the Internet and/or various telecommunications networks.

The computing unit 701 may be a variety of general-purpose and/or special-purpose processing components with processing and computing capabilities. Some examples of the computing unit 701 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 701 performs the methods and processing described above, such as the method for controlling the distributed operation system. For example, in some embodiments, the method for controlling the distributed operation system may be implemented as a computer software program that is tangibly embodied in a machine-readable medium, such as the storage unit 708. In some embodiments, part or all of a computer program may be loaded and/or installed on the electronic device 700 via the ROM 702 and/or the communication unit 709. One or more steps of the method for controlling the distributed operation system described above may be performed when the computer program is loaded into the RAM 703 and executed by the computing unit 701. Alternatively, in other embodiments, the computing unit 701 may be configured to perform the method for controlling the distributed operation system by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a load programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, a random access memory (RAM), a read-only memory (ROM), an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, speech input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN), the Internet and a block chain network.

The computer device may include a client and a server. The client and the server are generally far away from each other and generally interact via the communication network. A relationship between the client and the server is generated through computer programs that run on a corresponding computer and have a client-server relationship with each other. The server may be a cloud server, a distributed system server, or a server combined with a block chain.

It is understood that the steps can be reordered, added, or deleted using the various forms of processes shown above. For example, the steps described in the present application may be executed in parallel or sequentially or in different sequences, provided that desired results of the technical solutions disclosed in the present disclosure are achieved, which is not limited herein.

The above-mentioned embodiments do not limit the extent of protection of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the extent of protection of the present disclosure.

What is claimed is:

1. A method for controlling a distributed operation system, comprising:
   for a first container carrying a first process, determining a current fault type of a failure in the first container in response to detecting that the first process is triggered to terminate based on the failure in the first container;
   reconstructing the first container and restarting the first process based on the first container reconstructed in response to determining that the current fault type is consistent with a target fault type;
   wherein the target fault type is a fault type suitable for reconstruction of each container in the distributed operation system to which the first container belongs, and the fault type suitable for reconstruction of each container in the distributed operation system to which the first container belongs is a system failure that occurs in a failed container itself.

2. The method according to claim 1, wherein the target fault type is represented by a first identifier;
   determining that the current fault type is consistent with the target fault type is performed by:
   obtaining a second identifier representing the current fault type;
   determining that the first identifier matches the second identifier.

3. The method according to claim 2, wherein the first identifier comprises a first exit code generated by the first container when a failure of the target fault type occurs in the first container;
   wherein obtaining the second identifier representing the current fault type comprises:
   obtaining a second exit code generated by the first container based on the current fault type;
   determining that the first identifier matches the second identifier comprises:
   determining that the first exit code matches the second exit code.

4. The method according to claim 1, before reconstructing the first container, further comprising:
   obtaining container reconstruction information; wherein the container reconstruction information is configured to indicate a container to be reconstructed when a failure occurs in a container; and
   determining that the container to be reconstructed comprises the first container based on the container reconstruction information.

5. The method according to claim 4, further comprising:
   reconstructing a second container, and restarting a second process carried by the second container based on the second container reconstructed in response to determining that the container to be reconstructed comprises the second container based on the container reconstruction information;
   the second container comprises at least one of:
   a container in a replica set to which the first container belongs;
   a container in a replica set that has an association relationship with the replica set to which the first container belongs; or a container in an operation to which the first container belongs.

6. An electronic device, comprising:
   at least one processor; and
   a memory communicatively connected to the at least one processor; wherein
   the memory stores instructions executable by the at least one processor, and the at least one processor is configured to
   for a first container carrying a first process, detect that the first process is triggered to terminate based on a failure in the first container;
   determine a current fault type in the first container in response to detecting that the first process is triggered to terminate based on the failure in the first container;
   reconstruct the first container and restart the first process based on the first container reconstructed in response to determining that the current fault type is consistent with a target fault type;
   wherein the target fault type is a fault type suitable for reconstruction of each container in the distributed operation system to which the first container belongs, and the fault type suitable for reconstruction of each container in the distributed operation system to which the first container belongs is a system failure that occurs in a failed container itself.

7. A non-transitory computer-readable storage medium having stored therein computer instructions configured to cause a computer to
   for a first container carrying a first process, detect that the first process is triggered to terminate based on a failure in the first container;
   determine a current fault type in the first container in response to detecting that the first process is triggered to terminate based on the failure in the first container;
   reconstruct the first container and restart the first process based on the first container reconstructed in response to determining that the current fault type is consistent with a target fault type;
   wherein the target fault type is a fault type suitable for reconstruction of each container in the distributed operation system to which the first container belongs, and the fault type suitable for reconstruction of each container in the distributed operation system to which the first container belongs is a system failure that occurs in a failed container itself.

8. The electronic device according to claim 6, wherein the target fault type is represented by a first identifier;
   the at least one processor is configured to:
   obtain a second identifier representing the current fault type;
   determine that the first identifier matches the second identifier.

9. The electronic device according to claim 8, wherein the first identifier comprises a first exit code generated by the first container when a failure of the target fault type occurs in the first container;
   wherein the at least one processor is configured to obtain the second identifier representing the current fault type by: obtaining a second exit code generated by the first container based on the current fault type;
   the at least one processor is configured to determine that the first identifier matches the second identifier by: determining that the first exit code matches the second exit code.

10. The electronic device according to claim 6, wherein the at least one processor is further configured to:

obtain container reconstruction information before reconstructing the first container; wherein the container reconstruction information is configured to indicate a container to be reconstructed when a failure occurs in a container; and
determine that the container to be reconstructed comprises the first container based on the container reconstruction information.

11. The electronic device according to claim 10, wherein the at least one processor is further configured to:
    reconstruct a second container, and restart a second process carried by the second container based on the second container reconstructed in response to determining that the container to be reconstructed comprises the second container based on the container reconstruction information;
    wherein the second container comprises at least one of:
    a container in a replica set to which the first container belongs;
    a container in a replica set that has an association relationship with the replica set to which the first container belongs; or
    a container in an operation to which the first container belongs.

12. The non-transitory computer-readable storage medium according to claim 7, wherein the target fault type is represented by a first identifier;
    wherein the computer instructions are configured to cause the computer to:
    obtain a second identifier representing the current fault type;
    determine that the first identifier matches the second identifier.

13. The non-transitory computer-readable storage medium according to claim 12, wherein the first identifier comprises a first exit code generated by the first container when a failure of the target fault type occurs in the first container;
    wherein the computer instructions are configured to cause the computer to:
    obtain a second exit code generated by the first container based on the current fault type;
    determine that the first exit code matches the second exit code.

14. The non-transitory computer-readable storage medium according to claim 7, wherein the computer instructions are configured to cause the computer to:
    obtain container reconstruction information before reconstructing the first container; wherein the container reconstruction information is configured to indicate a container to be reconstructed when a failure occurs in a container; and
    determine that the container to be reconstructed comprises the first container based on the container reconstruction information.

15. The non-transitory computer-readable storage medium according to claim 14, wherein the computer instructions are configured to cause the computer to:
    reconstruct a second container, and restart a second process carried by the second container based on the second container reconstructed in response to determining that the container to be reconstructed comprises the second container based on the container reconstruction information;
    wherein the second container comprises at least one of:
    a container in a replica set to which the first container belongs;

a container in a replica set that has an association relationship with the replica set to which the first container belongs; or a container in an operation to which the first container belongs.

\* \* \* \* \*